United States Patent Office 3,707,570
Patented Dec. 26, 1972

3,707,570
DIHALOGENATION OF ALKYLCYCLOHEXANES
Abraham Schneider, Overbrook Hills, Pa., assignor to Sun Oil Company, Philadelphia, Pa.
No Drawing. Continuation-in-part of application Ser. No. 702,789, Feb. 5, 1968. This application Dec. 9, 1969, Ser. No. 883,579
The portion of the term of the patent subsequent to Dec. 23, 1986, has been disclaimed
Int. Cl. C07c 17/10, 23/10
U.S. Cl. 260—648 R                    22 Claims

ABSTRACT OF THE DISCLOSURE

Alkylcyclohexanes having one or more unbranched alkyl substituents of 1–3 carbon atoms each are dichlorinated or dibrominated by reacting the same under homogeneous conditions and at −30° C. to 20° C. with a $C_4$–$C_5$ tertiary alkyl chloride or bromide, using as catalyst dissolved $AlCl_3$ or $AlBr_3$, and then recovering a dichloro or dibromo alkylcyclohexane product in which the two halogen atoms are attached to the cyclohexane ring. The products have utility as intermediates for preparing difunctional derivatives, e.g. diacids, dialcohols or diamides, which are useful as monomers in polymer manufacture.

CROSS REFERENCE TO RELATED APPLICATION

This application is a continuation-in-part of my copending application Ser. No. 702,789, filed Feb. 5, 1968, now Patent No. 3,485,880, issued Dec. 23, 1969, which discloses and claims a process for polychlorinating or polybrominating $C_{10}$–$C_{20}$ adamantane hydrocarbons at bridgehead positions in the adamantane nucleus. The procedure involves reaction of the feed hydrocarbon under homogeneous conditions with a $C_4$–$C_5$ tertiary alkyl chloride or bromide, using as catalyst dissolved $AlCl_3$ or $AlBr_3$. The present process utilizes a similar procedure for dihalogenating alkylcyclohexanes.

Halogenations of other types of hydrocarbons by a similar procedure are described and claimed in my other copending applications as follows:

| Serial No. | Filing date | Title |
|---|---|---|
| 883,580 | Dec. 9, 1969 | Dihalogenation of branched alkanes. |
| 886,796 | Dec. 19, 1969 | Halogenation of polycyclic perhydroaromatics. |
| 886,797 | Dec. 19, 1969 | Dihalogenation of alkyldecahydronaphthalenes. |
| 887,377 | Dec. 22, 1969 | Dihalogenation of perhydropolyphenyl hydrocarbons. |

BACKGROUND OF THE INVENTION

This invention relates to the conversion of alkylcyclohexanes containing 1–6 unbranched alkyl groups of the $C_1$–$C_3$ range into dihalogenated derivatives in which the halogen is chlorine or bromine. The halogenating agent is a $C_4$–$C_5$ tertiary alkyl chloride or bromide. The products are dichloro or dibromo alkylcycloalkanes having the same number of carbon atoms as the starting material and containing the halogen atoms as ring substituents. These products have utility as intermediates for preparing difunctional derivatives, e.g., diacids, dialcohols or diamides, which are useful as monomers in polymer manufacture.

Hydrogen-halogen exchange reactions between a tertiary alkyl halide, such as t-butyl chloride, and various hydrocarbons containing one or more tertiary hydrogen atoms have been described in the prior art. A process involving this reaction has been described, for example, by C. W. Kruse, Preprints, ACS Pet. Div., vol. 12, No. 2, Advances in Petrochemical Symposium, Miami Beach, Fla. (April 1967). In the described process an aluminum chloride complex was used for effecting the reaction, which was conducted at room temperature. When methylcyclohexane was the feed, the only products obtained were the tertiary and secondary monochlorides. The reaction system was heterogeneous and no dichloride product was formed.

Mahan et al. United States Patent 3,230,269, dated Jan. 18, 1966 also discloses the monochlorination of methylcyclohexane in similar manner in a non-homogeneous reaction system.

Other hydrogen-halogen exchange reactions between tertiary butyl chloride and various hydrocarbons using aluminum trichloride as catalyst have been described in the following United States patents:

| Patentee | Patent No. | Issue date |
|---|---|---|
| Schmerling | 2,448,156 | Aug. 31, 1948. |
| Condon | 2,629,748 | Feb. 24, 1953. |
| Condon | 2,646,453 | July 21, 1953. |
| Schneider et al. | 2,742,507 | Apr. 17, 1956. |
| Gerzon | 3,096,372 | July 2, 1963. |
| Kruse et al. | 3,247,277 | Apr. 19, 1966. |

The reaction conditions taught in these references generally are such that the reaction system is heterogeneous, comprising a hydrocarbon phase and a catalyst phase. None of these references teaches the preparation of dihaloalkylcyclohexanes by means of a hydrogen-halogen interchange reaction.

SUMMARY OF THE INVENTION

The present invention provides a process for utilizing the hydrogen-halogen interchange reaction to convert certain types of cycloalkanes into dihalo derivatives. The starting cycloalkanes have the following characteristics: (1) they are alkylcyclohexanes with at least one tertiary carbon atom in the ring; and (2) they have one to six alkyl substituents which are methyl, ethyl or n-propyl or any combination thereof. The procedure involves a hydrogen-halogen interchange reaction between one or more of such alkylcyclohexanes and a $C_4$–$C_5$ tertiary alkyl chloride or bromide, promoted by means of $AlCl_3$ or $AlBr_3$ in solution. The reaction is carried out at a relatively low temperature, viz in the range of −30° C. to 20° C., and conditions are such that a homogeneous reaction mixture is maintained.

I have now found that in order to dihalogenate the starting alkylcyclohexane effectively it is essential that a substantially homogeneous reaction system be maintained with the aluminum trihalide catalyst in solution in the reactant mixture.

The process of the invention comprises the following steps:

(a) Forming a solution of (1) an alkylcyclohexane having 1–6 unbranched alkyl substituents containing 1–3 carbon atoms each and at least one tertiary carbon atom in the ring, and (2) a $C_4$–$C_5$ tertiary alkyl halide in which the halogen is chlorine or bromine in molar ratio to said hydrocarbon of at least 2:1, said solution being capable of dissolving and maintaining therein the aluminum trihalide hereinafter specified;

(b) Maintaining said solution at a temperature in the range of −30° C. to 20° C. while admixing therewith and dissolving therein an aluminum trihalide in which the halogen is the same as that in the tertiary halide, the weight ratio of aluminum trihalide to the tertiary halide being sufficient to promote dihalogenation of said alkylcyclohexane;

(c) Maintaining the resulting solution within said temperature range and in homogeneous phase until at least substantial dihalogenation of the alkylcyclohexane has occurred;

(d) And recovering from the reaction mixture a dihalogenated alkylcyclohexane product in which the two halogen atoms are attached to the cyclohexane ring.

DESCRIPTION

As a specific illustration of the process, 10 parts (by weight) of 1,4-diethylcyclohexane are dissolved in 100 parts of tertiary butyl bromide, the solution is cooled to $-5°$ C. and 3 parts of $AlBr_3$ powder are mixed into and dissolved in the solution. The mixture is stirred at $-5°$ C. for 30 minutes, during which time isobutane is formed and partly evolves. Then $AlBr_3$ in amount of 3 parts again is added and mixing is continued at $-5°$ C. for 30 minutes more. The mixture remains essentially homogeneous, no separate catalyst complex phase being formed. The mixture is then washed with water to remove the inorganic material and fractionally distilled. A dibrominated product fraction is recovered, the main component of which is 1,4-dibromo-1,4-diethylcyclohexane.

As a further specific illustration, 10 parts of methylcyclohexane are dissolved in a mixture of 40 parts of t-butyl chloride and 40 parts of methylene chloride, the solution is agitated at about 0° C., 1 part of $AlCl_3$ powder is dissolved therein and mixing is continued for one hour. After this, $AlCl_3$ is added twice again each time in the same amount as before, and the mixture is agitated for one hour at 0° C. after each addition. All of the catalyst goes into and remains in solution during the reaction. Water washing followed by fractional distillation of the reaction mixture yields a dichloromethylcyclohexane fraction as one of the products. This fraction is composed of a mixture of isomers most of which have a chlorine atom attached to the same carbon atom as the methyl group. In this illustration the methylene chloride does not enter into the reaction, serving merely as an inert solvent.

The halogenating agent for practicing the invention must be a $C_4$ or $C_5$ tertiary alkyl chloride or bromide or, in other words, t-butyl or t-amyl chloride or bromide. Primary or secondary halides are not suitable, for these will not react in the manner desired. Also it is essential for purposes of the present invention that a low reaction temperature, i.e., in the range of $-30°$ C. to 20° C., be used, since at higher temperatures cracking reactions will occur causing sludge to precipitate and the desired dihalo derivatives will not be produced in substantial amounts. Preferably a reaction temperature in the range of $-10°$ C. to 10° C. is employed.

It is also important in the present process that the reaction mixture comprising the alkylcyclohexane and the $C_4$-$C_5$ tertiary alkyl halide be capable of dissolving and maintaining in solution therein all of the $AlCl_3$ or $AlBr_3$ added. In other words, conditions must be such as to maintain substantially the entire reaction mixture as a single phase and avoid the formation of a separate catalyst complex phase. The preferred way of establishing and maintaining a homogeneous system is to utilize a considerable excess of the tertiary alkyl halide over the stoichiometric amount required for the desired degree of dihalogenation. When the $AlCl_3$ or $AlBr_3$ is added to the mixture, it reacts with the tertiary alkyl halide to form a complex and this complex must remain at least mainly in solution. The precise function of the complex is not known with certainty and it may be that at least part of it acts as the catalytic species. However, it is considered more probable that dissolved $AlCl_3$ or $AlBr_3$ is the catalytic agent and that, at least in the case of $AlCl_3$, the complex formed is necessary for bringing the $AlCl_3$ into solution. In any event, sufficient excess tertiary alkyl halide should be present to act as solvent for this catalyst complex and keep it in solution. Otherwise, if a homogeneous reaction mixture is not maintained and the catalyst complex forms a separate phase, substantial dihalogenation will not be achieved.

For example, when a dimethylcyclohexane is to be reacted with t-butyl chloride to give dichloro product, a substantial excess of t-butyl chloride over the stoichiometric 2:1 molar ratio should be used so that the aluminum chloride complex will remain in solution. Typically a molar ratio of t-butyl chloride to dimethylcyclohexane above 3:1, e.g., in the range of 4:1 to 20:1, can be employed to maintain a homogeneous solution. For dichlorination or dibromination of other starting hydrocarbons, analogous ratios of reactants are employed.

Another manner of practicing the invention to maintain homogeneity of the reaction mixture is to employ the $C_4$-$C_5$ tertiary alkyl halide in approximately the stoichiometric amount needed for the hydrogen-halogen interchange reaction, and additionally to use an inert halogenated solvent to keep in solution the complex formed between the tertiary alkyl halide and $AlCl_3$ or $AlBr_3$. Certain halogenated hydrocarbons are inert under conditions used in the process and will not themselves react with the aluminum trihalide to form a complex. These can be used as solvent to maintain the reaction mixture in homogeneous phase. Halogenated hydrocarbons which are suitable for this purpose include the following: methylene chloride; 1,1,2,2 - tetrachloroethane; pentachloroethane; and the bromine homologues of each of the foregoing solvents. This manner of practicing the invention is not, however, generally preferred since it requires an additional component in the reaction system, and it is usually preferable merely to use an excess of the $C_4$-$C_5$ tertiary alkyl halide as solvent and thus dispense with the need for an inert halogenated solvent.

The hydrocarbon feed can be one or more alkylcycloalkanes having one to six, inclusive, unbranched alkyl groups of the $C_1$-$C_3$ range. In other words, these substituents can be methyl, ethyl or n-propyl, or any combination of these alkyl groups. However, the cyclohexane ring should contain at least one tertiary carbon atom. This means that while gem substitution is permissible, the alkyl groups must not all be present as gem substituents in the starting hydrocarbon. Any alkylcycloalkanes as here defined can be dichlorinated in the present process to yield dihalo products. Alkylcyclohexanes of the $C_7$-$C_{10}$ range containing one or two alkyl substituents are preferred starting materials. In the case of singly substituted cyclohexanes a considerable proportion of the dihalo product generally will have one halogen atom attached to the same carbon atom to which the alkyl group is attached. For doubly substituted cyclohexanes a substantial amount of the dihalo product will have the halogen atoms attached to the same ring carbon atoms to which the two alkyl substituents are also attached, and particularly so when the alkyl groups are in 1,4-positions. The spacing of alkyl groups in the product will not necessarily be the same as in the starting alkylcyclohexane and at least part of the dihalo product usually will have its alkyl groups arranged on the ring differently from the original arrangement.

The following are some examples of hydrocarbons which are suitable as feed material for the present process. It is to be understood that the specific positions of the alkyl substituents on the cyclohexane ring are not critical and do not affect the operability of the process, as long as the starting hydrocarbon contains at least one tertiary carbon atom. However, a 1,4-substitution in the starting material tends to facilitate dihalogenation, probably due to anchimeric assistance.

Singly substituted alkylcyclohexanes; methylcyclohexane; ethylcyclohexane and n-propylcyclohexane.

Doubly substituted alkylcyclohexanes: 1,2-, 1,3- or 1,4-dimethylcyclohexane; 1,2-, 1,3- or 1,4-diethylcyclohexane; 1,2-, 1,3- or 1,4-di-n-propylcyclohexane; 1-methyl-2-ethyl-, 1-methyl-3-ethyl- or 1-methyl-4-ethylcyclohexane; methyl-n-propylcyclohexanes; and ethyl-n-propylcyclohexanes.

Other cyclohexanes having the following substitutional arrangements: 1,1,3- or 1,2,3- or 1,2,4- or 1,2,5-trimethyl or -triethyl or -tri-n-propyl; 1,2-dimethyl-4-ethyl; 1,1-dimethyl-3-ethyl-; 1-methyl-3-ethyl-4-n-propyl; 1-methyl-3,3-diethyl; 1,3-diethyl-4-n-propyl; 1,2,4,5- or 1,2,3,4- or 1,1,3,5-tetramethyl or -tetraethyl or -tetra-n-propyl; penta- or hexamethyl; penta- or hexaethyl; penta or hexa-n-propyl; and the like.

The following equation illustrates the desired reaction, starting with 1,4-dimethylcyclohexane (cis or trans) and t-butyl chloride (most hydrogen atoms being omitted, for convenience):

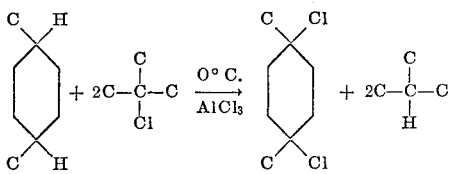

The products of the reaction, as shown, are 1,4-dichloro-1,4-dimethylcyclohexane and isobutane. This dichloro compound is favored kinetically and also thermodynamically and will constitute the major part of the dichloro material obtained from 1,4-dimethylhexane. However minor amounts of isomeric dichloro products generally also will be formed, including isomers resulting from shifting of positions of chlorine atoms as well as methyl groups. Besides containing these dichloro compounds the final reaction mixture will include mixed monochlorinated products including both secondary and tertiary monochlorides. These usually will exceed the dichloro products in amount in view of the difficulty in achieving dihalogenation of the ring via hydrogen-halogen interchange reaction even under homogeneous reaction conditions.

In the foregoing equation the positions of the methyl groups in the dihalo product are the same as in the starting alkane, but this would not necessarily be the case for other dimethylcyclohexanes. The 1,4- spacing of alkyl and halogen substituents is favored in the product, and this spacing of alkyl groups in the feed aids in effecting dihalogenation through anchimeric assistance [see Winstein et al., JACS, 75, 147 (1953)]. However, if the alkyl substituents originally have other spacings on the ring, dihalogenation will occur but more slowly. In the earlier stages of reaction the dihalogenated product that is formed will be composed mainly of isomers in which the alkyl groups are located other than at 1,4-positions, but as the reaction is continued isomerization will occur, resulting in the conversion of these isomers to the 1,4-dihalo-1,4-dialkyl isomer. For example, if the starting hydrocarbon is 1-methyl-3-ethyl-cyclohexane and a relatively small amount of $AlCl_2$ is used (e.g. 1.5 weight percent based on t-butyl chloride), the dichloro product at that stage will be a mixture of isomers of which the 1,4-dichloro-1-methyl-4-ethyl isomer is a minor component. However, as the reaction is continued by the addition of more $AlCl_3$, not only will the total amount of dichloro product increase but also a considerable increase in the ratio of 1,4-dichloro-1-methyl-4-ethylcyclohexane to the other dichloro isomers will occur. Continuation of the reaction will tend to give an equilibrium mixture of dichloro isomers in which this particular isomer is a favored product.

When the starting alkylcycloalkane has only one alkyl substituent, dihalogenation of the ring likewise will occur under conditions of the present process, but this takes place more slowly than in the case of 1,4-dialkylcycloalkanes evidently due to a slower anchimeric assistance effect. A major portion of the dihalo product generally will have one of the halogen substituents attached to the same ring carbon atom as the alkyl group but a substantial amount of isomeric product in which both halogens are at secondary positions usually will also be present.

The reaction also can produce minor amounts of other types of reaction products, depending upon the particular alkyl cyclohexane used as feed and the reaction conditions employed. These minor reaction products come about as a result of side reactions involving alkylation, disproportionation and/or dimerization in combination with the hydrogen-halogen interchange reaction.

A preferred way of carrying out the invention utilizing an excess of tertiary alkyl halide as solvent is given in the following description using t-butyl chloride as the tertiary halide and $AlCl_3$ as catalyst. The starting alkylcyclohexane is dissolved in the t-butyl chloride, using, for example, between 5 and 15 moles of t-butyl chloride per mole of the alkylcyclohexane; and the mixture is cooled to 0° C. While the mixture is being well agitated, $AlCl_3$ is added thereto in amount usually between 1.5 and 20 parts by weight per hundred parts of t-butyl chloride. In some cases it may be advantageous to add the $AlCl_3$ in incremental amounts throughout a time of 10–60 minutes in order to more easily control reaction conditions such as temperature and rate of gas evolution. However, if control of the reaction presents no problem, substantially the same results can be obtained by adding all of the required amount of $AlCl_3$ at once.

When an amount of $AlCl_3$ is added, it goes into solution and forms with the t-butyl chloride a complex which remains in solution. As previously mentioned, the complex formed may act as solvent for uncomplexed $AlCl_3$ which, when brought into solution, functions as the catalytic agent. This promotes the hydrogen-chlorine exchange reaction. Also a slow evolution of HCl generally occurs indicating some side reaction, and the catalyst activity concurrently declines until the reaction ceases. Addition if a further amount of $AlCl_3$ will then result in more solubilized catalyst and further promote the hydrogen-chlorine exchange reaction until the catalyst activity again diminishes. The procedure of adding incremental amounts of $AlCl_3$ can be continued to promote the exchange reaction until an optimum degree of dichlorination has been reached. Alternatively, all of the $AlCl_3$ needed can be added at the beginning provided that the reaction does not proceed so fast as to get out of control. Removal of isobutane from the system as it is formed will expedite the hydrogen-halogen exchange reaction.

The amount of $AlCl_3$ or $AlBr_3$ that should be used depends mainly upon the amount of tertiary alkyl halide in the mixture and the reaction temperature selected within the specified range of −30° C. to 20° C. The higher the reaction temperature the greater is the tendency of the $AlCl_3$ or $AlBr_3$ to be consumed in side reactions and the more that will be required. Preferably, the weight proportion of total aluminum trihalide to tertiary alkyl halide should be in excess of 1.5:100 and sufficiently in excess of this ratio to maximize yield of the dihalogenation product. Side reactions can be inhibited by maintaining a pressure of hydrogen chloride in the reaction system, e.g. by maintaining a partial pressure of HCl in the range of 50–100 p.s.i.

When the reaction has been completed, the mixture can be washed with water to remove the catalyst residues and then the dihalogenated product can be separated from the other components in any suitable manner, for example, by fractional crystallization or distillation.

The dibromo or dichloro alkylcyclohexanes produced by the present invention are useful as intermediates for preparing monomers suitable for making various types of polymers such as polyesters or polyamides. For example, the dihaloalkanes can be reacted in the presence of strong sulfuric acid with formic acid [see Koch et al., Liebig's Annalen der. Chemie, 618 (1958), 251–266] to produce corresponding diacids, or with HCN or nitriles [analogous to Ritter reaction, JACS, 70 (1948), 4045–4048] to form corresponding diamides. Dialcohols, also useful as monomers, can be made by esterifying the diacids and hydrogenating the resulting diesters. Such diacids and dialcohols can be used, for example, to make copolymers analogous to those shown in Caldwell et al. U.S. Pat. 2,891,930, issued June 23, 1959, which describes the use of 1,4-cyclohexanedicarboxylic acid and various diols for preparing polyesters.

The following examples are specific illustrations of the invention. In the tables accompanying the examples the total amount of $AlCl_3$ that has been used up to the time of each sampling is indicated in terms of g. $AlCl_3$ per 100 g. of t-butyl chloride employed.

Example I

This example illustrates the reaction of methylcyclohexane (herein "MCH") with t-butyl chloride. A solution of 1.00 g. (0.0102 mole) of MCH, 3.72 g. (0.0402 mole) of t-butyl chloride and 4.0 ml. of methylene chloride was stirred at 0° C. and 0.10 g. of $AlCl_3$ powder was added. The molar ratio of t-butyl chloride to MCH was about 4.0. The $AlCl_3$ dissolved, the solution became bright yellow and a slow evolution of HCl was noted. The mixture was stirred at 0° C. for 132 minutes, and then one-half of the mixture was taken as a sample. This was diluted with pentane to precipitate a small amount of catalyst complex which was separated. The hydrocarbon layer was water washed and dried with potassium carbonate, and the pentane was then evaporated to give a sample for analysis (Cut 1). To the remainder, 0.10 g. of $AlCl_3$ powder again was added and mixing was continued for 66 minutes more at 0° C. The reaction mixture was then diluted with pentane to precipitate catalyst complex and worked up in the same way as for Cut 1 to give another sample (Cut 2) for analysis. The reaction mixture was essentially homogeneous during the entire reaction period. Each of the samples was analyzed by GLC. Results are shown in Table I and are given in weight percent on a t-butyl chloride-free and methylene chloride-free basis.

TABLE I.—REACTION OF METHYLCYCLOHEXANE

| Cut | 1 | 2 |
|---|---|---|
| Total reaction time, minute | 132 | 198 |
| Grams $AlCl_3$/100 Grams t-butyl chloride | 2.7 | 8.1 |
| Product composition, weight percent | | |
| MCH | 0.9 | Trace |
| MCH tertiary mono Cl | 48.3 | 40.4 |
| MCH secondary mono Cl | 46.6 | 41.0 |
| MCH dichlorides I [1] | 2.7 | 11.5 |
| MCH dichlorides II [2] | 1.6 | 7.0 |

[1] Isomers with one chlorine at tertiary carbon atom.
[2] Isomers with both chlorines at secondary carbon atoms.

Table I shows that a monoalkylcyclohexane does not dichlorinate rapidly but nevertheless that substantial dichlorinated products can be obtained if a sufficient amount of $AlCl_3$ is used under homogeneous conditions.

Example II

Another run was made in generally the same way as Example I but using ethylcyclohexane as the starting hydrocarbon. Specifically, a mixture of 1.00 g. (0.0091 mole) of ethylcyclohexane (herein "ECH"), 3.29 g. (0.0355 mole) of t-butyl chloride and 4.0 ml. of methylene chloride was prepared and cooled to 0° C. $AlCl_3$ powder in an amount of 0.05 g. was added and the resulting solution was stirred at about 0° C. for 10 minutes. A one ml. sample (Cut 1) taken at this time and diluted with pentane showed no significant amount of precipitate. To the remainder, 0.1 g. of $AlCl_3$ was added and stirring of the resulting solution at 0° C. was continued for 10 minutes more, following which another one ml. sample (Cut 2) was taken. Dilution of this with pentane caused some precipitation of yellow complex. Another 0.1 g. portion of $AlCl_3$ was added to the reaction mixture and stirring was continued for 20 minutes more. The mixture was then diluted with pentane causing a light orange complex to precipitate. The final hydrocarbon phase (Cut 3) and the previous samples were water washed and dried and, after evaporation of the pentane, were analyzed by GLC, giving the results shown in Table II.

TABLE II.—REACTION OF ETHYLCYCLOHEXANE

| Cut | 1 | 2 | 3 |
|---|---|---|---|
| Total reaction time, minutes | 10 | 20 | 40 |
| Grams $AlCl_3$/100 grams t-butyl chloride | 1.5 | 4.9 | 6.7 |
| Product composition, weight percent: | | | |
| ECH | 6.5 | 5.2 | 5.5 |
| Dimethylcyclohexanes | 3.4 | 15.7 | 18.9 |
| ECH tertiary monochloride | 37.7 | 27.7 | 23.3 |
| ECH secondary monochloride | 48.7 | 32.2 | 29.9 |
| ECH dichlorides | 3.6 | 19.1 | 22.4 |

The results of Table II show that substantial amounts of ethylcyclohexyl dichlorides can be produced. This dichloride fraction was a complex isomeric mixture in which the lowest boiling component, probably 1,4-dichloro-4-ethylcyclohexane, appeared as a sharp peak on the chromatograph and was present in largest concentration.

Example III

This example illustrates the reaction of t-butyl chloride with a dimethylcyclohexane (herein "DMCH"), viz cis-1,4-DMCH. The starting mixture was composed of 1.00 g. of cis-1,4-DMCH, 3.29 g. of t-butyl chloride and 4.0 ml. of methylene chloride. The reaction temperature was maintained at 0° C. and the procedure was similar to that of the preceding examples, with additions of $AlCl_3$ being made at various times followed by reaction for times as indicated in Table III. The samples were worked up and analyzed in the same manner as previously.

TABLE III.—REACTION OF CIS-1,4-DIMETHYLCYCLOHEXANE

| Cut | 1 | 2 | 3 | 4 |
|---|---|---|---|---|
| Total reaction time, minutes | 20 | 40 | 60 | 80 |
| Grams $AlCl_3$/100 grams of t-butyl chloride | 1.5 | 1.5 | 5.3 | 7.5 |
| Product composition, weight percent: | | | | |
| Trans-1,4-DMCH | 4.4 | 4.4 | 4.1 | 4.4 |
| 1-chloro-1,4-DMCH | 62.4 | 65.3 | 37.3 | 36.3 |
| Secondary-chloro-1,4-DMCH | 20.7 | 15.8 | 21.1 | 22.5 |
| 1,4-dichloro-1,4-DMCH | 7.7 | 7.9 | 27.4 | 22.9 |
| Other dichloro-DMCH | 4.8 | 6.6 | 10.0 | 13.9 |

The data in Table III show that substantial amounts of dichlorinated dimethylcyclohexanes were formed, with the predominant isomer being 1,4-dichloro-1,4-dimethylcyclohexane. The data also indicated that there is an optimum proportion of $AlCl_3$ to t-butyl chloride to use corresponding to a maximum yield of dichloro products obtained. In this case this optimum is indicated to coincide about with Cut 3 where such proportion was 5.3 g. $AlCl_3$/100 g. t-butyl chloride and a maximum dichloro products content of about 37% was reached.

Example IV

This example shows the reaction of another dimethylcyclohexane, viz trans-1,4-DMCH. The reaction mixture was composed of 1.00 g. trans-1,4-DMCH, 3.29 g. of t-butyl chloride and 4.0 ml. of methylene chloride. The reaction was carried out at 0° C. in essentially the same manner as the preceding example. The amounts of $AlCl_3$ used, reaction times and compositions of reaction products are shown in Table IV.

TABLE IV.—REACTION OF TRANS-1,4-DIMETHYLCYCLOHEXANE

| Cut | 1 | 2 | 3 | 4 |
|---|---|---|---|---|
| Total reaction time, minutes | 20 | 40 | 60 | 91 |
| Grams $AlCl_3$/100 Grams of t-butyl chloride | 0.9 | 1.9 | 3.8 | 5.1 |
| Product composition, weight percent: | | | | |
| Trans-1,4-DMCH | 55.2 | 44.6 | 3.6 | 4.4 |
| 1-chloro-1,4-DMCH | 28.8 | 47.3 | 35.1 | 36.7 |
| Secondary-chloro-1,4-DMCH | 9.5 | 23.5 | 19.5 | 20.0 |
| 1,4-dichloro-1,4-DMCH | 5.8 | 18.8 | 31.5 | 29.1 |
| Other dichloro-DMCH | 0.6 | 5.8 | 10.4 | 9.9 |

The results of Table IV show that the trans-1,4-isomer can be converted to dichloro products in much the same fashion as the cis-1,4-isomer. The results indicate that Cut 3 represents the stage of approximately maximum yield of dichloro products (42%) under the conditions used and that further addition of $AlCl_3$ tends to reduce the amount of the dichloro materials obtained.

Example V

In this example cis-1,3-DMCH was reacted with t-butyl chloride under conditions approximating those of the preceding example, using amounts of $AlCl_3$ and reaction times as indicated in Table V.

TABLE V.—REACTION OF CIS-1,3-DIMETHYLCYCLOHEXANE

| Cut | 1 | 2 | 3 | 4 |
|---|---|---|---|---|
| Total reaction time, minutes | 2 | 30 | 50 | 80 |
| Gram $AlCl_3$/100 grams of t-butyl chloride | 1.5 | 1.5 | 2.5 | 4.4 |
| Product composition, weight percent: | | | | |
| Cis-1,3-DMCH | 41.7 | 36.8 | 5.1 | 5.8 |
| 1-chloro-1,3- and 1,4-DMCH | 39.9 | 42.3 | 54.7 | 45.2 |
| Secondary-chloro-DMCH | 14.6 | 14.7 | 30.3 | 28.2 |
| 1,4-dichloro-1,4-DMCH | 0.9 | 1.1 | 2.1 | 8.4 |
| Other dichloro-DMCH | 2.9 | 5.2 | 7.8 | 12.4 |

A comparison of the results of Table V with those of Tables III and IV indicates that the formation of dichloro products from a 1,3-substituted cyclohexane occurs more slowly than for the corresponding 1,4-isomers. In this case the maximum total percent of dichloro products obtained amounted to about 21% (Cut 4) corresponding to a ratio of total g. $AlCl_3$/100 g. t-butyl chloride of 4.4, but the data do not indicate that the optimum amount of $AlCl_3$ had yet been reached.

Example VI

In this example cis-1,2-DMCH was reacted in substantially the same manner as shown in the preceding examples, using amounts of $AlCl_3$ and reaction times as given in Table VI.

TABLE VI.—REACTION OF CIS-1,2-DIMETHYLCYCLOHEXANE

| Cut | 1 | 2 | 3 |
|---|---|---|---|
| Total reaction time, minutes | 20 | 40 | 100 |
| Grams $AlCl_3$/100 grams of t-butyl chloride | 3.0 | 6.4 | 8.3 |
| Product composition, weight percent: | | | |
| Cis-1,3-DMCH | Trace | 1.4 | 2.5 |
| Trans-1,2-DMCH | 1.5 | 4.4 | 3.5 |
| Cis-1,2-DMCH | 15.5 | 0.4 | 0.3 |
| 1-chloro-1,3- and 1,4-DMCH | 1.9 | 15.1 | 24.8 |
| 1-chloro-1,2-DMCH | 57.3 | 41.2 | 33.1 |
| Secondary-chloro-DMCH | 22.1 | 29.1 | 21.5 |
| 1,4-dichloro-1,4-DMCH | Trace | 1.4 | 3.5 |
| Other dichloro-DMCH | 1.5 | 7.0 | 10.8 |

A comparison of the results of Table VI with those in Tables III and V shows that the 1,2-isomer reacts more slowly than the others. In this case the maximum amount of dichloro product obtained was approximately 14%. A higher yield of dichloro material could have been reached by utilizing further amounts of $AlCl_3$.

Example VII

Example VI was substantially repeated substituting trans-1,2-DMCH for the cis-1,2-isomer. The amounts of $AlCl_3$ used and reaction times are shown in Table VII along with the results of analyses.

TABLE VII.—REACTION OF TRANS-1,2-DIMETHYLCYCLOHEXANE

| Cut | 1 | 2 | 3 |
|---|---|---|---|
| Total reaction time, minutes | 20 | 40 | 60 |
| Grams $AlCl_3$/100 grams of t-butyl chloride | 0.9 | 1.9 | 3.8 |
| Product composition, weight percent: | | | |
| cis-1,3-DMCH | | 0.2 | 5.3 |
| trans-1,2-DMCH | 75.6 | 14.8 | |
| cis-1,2-DMCH | 0.2 | (¹) | |
| 1-chloro-1,3- and 1,4-DMCH | 3.3 | 5.9 | 15.1 |
| 1-chloro-1,2-DMCH | 12.6 | 40.1 | 38.2 |
| Secondary-chloro-DMCH | 8.3 | 32.3 | 32.6 |
| 1,4-dichloro-1,4-DMCH | (¹) | 1.1 | 1.5 |
| Other dichloro-DMCH | (¹) | 5.5 | 7.3 |

¹ Trace.

The results of Table VII show that the trans-1,2-DMCH reacts in generally the same fashion as the cis-isomer of Example VI but appears to give chlorinated products somewhat more readily. The maximum yield of dichloro products obtained was about 9% at a ratio of g. $AlCl_3$/100 g. t-butyl chloride of 3.8. This yield could have been increased by using additional amounts of $AlCl_3$.

Example VIII

The feed in this case was a mixture of the cis- and trans-1,4-isomers of methylethylcyclohexane (herein "MECH"). The reaction mixture was composed of 1.00 g. of these mixed isomers, 2.93 g. of t-butyl chloride and 4.0 ml. of methylene chloride. The reaction temperature was 0° C. and the proportions of $AlCl_3$ and reaction times are as shown in Table VIII.

TABLE VIII.—REACTION OF CIS- AND TRANS-1-METHYL-4-ETHYLCYCLOHEXANE

| | Charge | Cut 1 | Cut 2 |
|---|---|---|---|
| Total reaction time, minutes | 0 | 30 | 52 |
| Grams $AlCl_3$/100 grams of t-butyl chloride | 0 | 1.7 | 3.2 |
| Composition, weight percent: | | | |
| Trans-1,4-MECH | 32.8 | 5.5 | 6.3 |
| Cis-1,4-MECH | 67.2 | 0.7 | 0.6 |
| Tertiary-chloro-1,4-MECH | | 38.3 | 38.9 |
| Secondary-chloro-MECH | | 22.2 | 21.9 |
| 1,4-dichloro-1,4-MECH | | 27.8 | 25.2 |
| Other dichloro-MECH | | 5.5 | 7.1 |

The data in Table VIII show that good yields of dichloro derivatives of these methylethylcyclohexanes can be obtained, with the main dichloro product being 1,4-dichloro-1-methyl-4-ethyl-cyclohexane.

Analogous results are obtained when other alkylcyclohexanes as herein specified are substituted for the starting alkanes used in the foregoing examples. As a general rule, an increase in the number of alkyl substituents on the cyclohexane ring tends to make its dichlorination take place more readily. Likewise essentially equivalent results are obtained when tertiary butyl bromide with $AlBr_3$ as catalyst is used in place of the tertiary chloride. The halogenation reaction also proceeds in essentially the same manner when tertiary amyl chlorides or bromides are used, but in such cases more side reactions tend to occur.

The invention claimed is:

1. Process of preparing dihalogenated alkylcyclohexanes which comprises:
   (a) forming a solution of (1) an alkylcyclohexane having 1–6 unbranched alkyl substituents containing 1–3 carbon atoms each and at least one tertiary carbon atom in the cyclohexane ring, and (2) a $C_4$–$C_5$ tertiary alkyl halide in which the halogen is chlorine or bromine in molar ratio to said alkylcyclohexane of at least 2:1, said solution being capable of dissolving and maintaining therein the aluminum trihalide hereinafter specified;
   (b) maintaining said solution at a temperature in the range of $-30°$ C. to 20° C. while admixing therewith and dissolving completely therein so as to form a homogeneous solution an aluminum trihalide in which the halogen is the same as that in said tertiary halide, the weight ratio of aluminum trihalide to the tertiary halide being sufficient to promote dihalogenation of said alkylcyclohexane;
   (c) maintaining the resulting solution within said temperature range and in homogeneous phase until at least substantial dihalogenation of said alkylcyclohexane has occurred;
   (d) and recovering from the reaction mixture a dihalogenated alkylcyclohexane product in which the two halogen atoms are attached to the cyclohexane ring.

2. Process according to claim 1 wherein said $C_4$–$C_5$ tertiary alkyl halide is tertiary butyl chloride or bromide.

3. Process according to claim 2 wherein said temperature is in the range of $-10°$ C. to 10° C.

4. Process according to claim 3 wherein said weight ratio of aluminum trihalide to the tertiary butyl halide is above 1.5:100.

5. Process according to claim 1 wherein the alkylcyclohexane is of the $C_7$–$C_{10}$ range and the alkyl substituents are selected from methyl and ethyl.

6. Process according to claim 5 wherein the starting alkylcyclo-hexane contains a single alkyl substituent.

7. Process according to claim 6 wherein said $C_4$–$C_5$ tertiary alkyl halide is tertiary butyl chloride or bromide, and said weight ratio of aluminum trihalide to the tertiary butyl halide is above 1.5:100.

8. Process according to claim 7 wherein said temperature is in the range of −10° C. to 10° C. and the halogen in the tertiary butyl halide and in the aluminum trihalide is chlorine.

9. Process according to claim 5 wherein the starting alkylcyclo-hexane contains two alkyl substituents.

10. Process according to claim 9 wherein said $C_4$-$C_5$ tertiary alkyl halide is tertiary butyl chloride or bromide, and said weight ratio of aluminum trihalide to the tertiary butyl halide is above 1.5:100.

11. Process according to claim 10 wherein said temperature is in the range of −10° C. to 10° C. and the halogen in the tertiary butyl halide and in the aluminum trihalide is chlorine.

12. Process according to claim 11 wherein the alkylcyclohexane is a dimethylcyclohexane and product comprising 1,4-dichloro-1,4-dimethylcyclohexane is recovered.

13. Process according to claim 12 wherein the alkylcyclohexane is 1,4-dimethylcyclohexane.

14. Process according to claim 1 wherein the alkylcyclohexane contains a single alkyl substituent.

15. Process according to claim 14 wherein the tertiary halide is tertiary butyl chloride, the aluminum trihalide is $AlCl_3$, and the weight ratio of $AlCl_3$ to tertiary butyl chloride is above 1.5:100.

16. Process according to claim 15 wherein said substituent is methyl or ethyl.

17. Process according to claim 1 wherein the alkylcycloalkane contains two alkyl substituents.

18. Process according to claim 17 wherein the alkylcycloalkane contains said substituents in the 1,4-positions.

19. Process according to claim 17 wherein the tertiary halide is tertiary butyl chloride, the aluminum trihalide is $AlCl_3$, and the weight ratio of $AlCl_3$ to tertiary butyl chloride is above 1.5:100.

20. Process according to claim 1 wherein said temperature is in the range of −10° C. to 10° C. and said weight ratio of aluminum trihalide to the tertiary alkyl halide is above 1.5:100.

21. Process according to claim 20 wherein the tertiary halide is tertiary butyl bromide and the aluminum trihalide is $AlBr_3$.

22. Prcess according to claim 20 wherein the tertiary halide is tertiary butyl chloride and the aluminum trihalide is $AlCl_3$.

References Cited

UNITED STATES PATENTS

| | | | |
|---|---|---|---|
| 3,096,372 | 7/1963 | Gerzon | 424—321 |
| 3,485,880 | 12/1969 | Schneider | 260—648 R |

DANIEL D. HORWITZ, Primary Examiner